United States Patent [19]

Hock et al.

[11] Patent Number: 4,928,112

[45] Date of Patent: May 22, 1990

[54] INK CURING APPARATUS

[75] Inventors: Allan G. Hock, Londonderry; John R. Larson, Hamstead; John G. Sousa, Nashua, all of N.H.

[73] Assignee: Howtek, Inc., Hudson, N.H.

[21] Appl. No.: 28,924

[22] Filed: Mar. 23, 1987

[51] Int. Cl.$^5$ .......................... G01D 15/16; B41J 3/04
[52] U.S. Cl. .................... 346/25; 101/424.1; 346/134; 346/140 R
[58] Field of Search ............... 346/140, 1.1, 138, 136, 346/134, 25; 101/416 A, 424.1, 488; 400/126

[56] References Cited

U.S. PATENT DOCUMENTS

| 1,487,362 | 3/1924 | Rice | 101/424.1 |
| 3,854,399 | 12/1974 | Keur | 346/75 X |
| 4,340,893 | 7/1982 | Ort | 346/75 X |
| 4,463,361 | 7/1984 | Koumura | 346/134 |
| 4,469,026 | 9/1984 | Irwin | 101/424.1 X |
| 4,714,936 | 12/1987 | Helinski | 346/140 |

FOREIGN PATENT DOCUMENTS 156536 12/1979 Japan .

Primary Examiner—Joseph W. Hartary
Attorney, Agent, or Firm—Nutter, McClennen & Fish

[57] ABSTRACT

An ink curing apparatus for use with an ink jet printer that discharges liquefied ink is disclosed. The apparatus includes a shell assembly disposed around the portion of the printer imaging assembly that includes the ink jets. The imaging assembly and the shell wall are shaped so that a first cavity is formed between the imaging assembly and the paper printed on, and a second cavity is formed between the paper and the shell wall. A pair of fans are arranged to draw air currents over both sides of the portion of the paper that is being printed on. The air currents cool the paper so the ink solidifies upon contact with the paper and does not soak through it. The air currents also insure that the ink solidifies at a uniform rate regardless where it is applied on the paper. This insures the final image on the paper has a uniform appearance. The air currents also urge the portion of the paper being printed on against a frame structure that is an integral part of the shell so as to secure the paper during the printing process.

13 Claims, 3 Drawing Sheets

INK CURING APPARATUS

BACKGROUND OF THE INVENTION

1. Field of the Invention

This invention relates to ink jet printing systems, and in particular to an ink curing apparatus system to insure the uniform solidification of jetted ink on the paper to which it is applied.

2. Background of the Invention

Ink jet printers are becoming an increasing popular type of device for recording permanent images on paper. Ink jet printers operate by directing a stream of minute ink droplets at the paper so as to produce a distinct pattern of individual ink dots. By selectively depositing ink dots on paper, and by regulating the number of dots discharged onto the paper, an ink jet printer can be used to create almost any type of print: text; graphics; or images. This capability has made it attractive to attach ink jet printers to computer systems that produce both figurative and textual output simultaneously. This is because a properly programmed ink jet printer can be used to produce a complicated figure and a detailed description of the figure on the same page.

Moreover, many ink jet printers are capabile of discharging multiple colors of ink so as to generate quality color figures and and illustrations. This capabilty has contributed to their popularity since computer systems that can generate multi-color video output in the form of figures and images are becoming increasingly common. These computer systems require printing devices that can produce permanent images of the output they generate.

In the past, many ink jet printers have discharged liquid ink onto the paper. Some of these inks have caused problems because of their continual tendency to wick or bleed onto the paper, thus significantly blurring the optical edges of the individual ink dots. This blurring has significantly reduced the quality of the overall images they produce. Moreover, this blurring has made it extremely difficult to use liquid inking systems with printers discharging multiple colors of ink since the individual dots of different color blend together, so as to substantially distort the final image.

To overcome the problem of ink wicking and subsequent dot bluring, a number of ink jet printers rely on a heated or "hot-melt" inking systems such as the one disclosed in U.S. Pat. No. 3,247,519, dated Apr. 19, 1966 to Sihvonen for a Graphical Recording System Employing Heated Ink Compositions. The advantage of hot melt ink is that it solidifies relatively quickly as soon as it is deposited on the paper. This reduces the bleeding, or wicking, of ink on the paper so each ink dot has a well defined optical edge, and the final image has distinct features.

However, even when ink is discharged from a hotmelt inking system, there may be a tendency for some of the ink droplets to soak through or wick on the paper before it solidifies. Ink soak-in is likely to happen at locations on the paper where very dark images are produced, or multiple layers of ink are applied, and large amounts of ink must be applied. Some of the ink may soak into the paper, or may wick through through it due to the capillary action of paper's fiber structure. This soak-in and wicking will cause blurring of the optical edges of the individual ink dots, and cause the quality of the overall image produced to be degraded.

Moreover, many ink jet printers discharge ink that solidifies at different rates on the paper it is deposited on. This may be a problem for many inks because their final solid appearance is directly related to their crystalline structure, which is a function of the rate at which they solidify. Some inks, for example, if they solidify quickly, have a glossy appearance. If the same inks solidify slowly, they appear matted. If all the ink on a page does not solidify at a uniform rate, some of it may appear matted and some of it may appear glossy. As a result, the final image produced on the page may have an inconsistent and anaesthetic appearance.

Furthermore, some inks have a low physical strength and a poor ability to cling the paper they discharged onto. If these inks cure too quickly, their low clinging ability may be further reduced. This may cause the ink to crack or flake off the paper when it is bent or folded, reducing the image quality or possibly lossing information.

In ink jet printers it is desirable to securely position the paper a small distance away from the printing jets. Many printers rely on a relatively expensive, accurately positioned mechanical holding mechanism to do this. If the mechanism is distorted, such as may happen through wear or accidentally bending, the paper may not be properly seated in relationship to the ink jets. If this happens, when ink is applied to the paper, it will be in the wrong location and the resulting image may not accurately depict what it was intended to show.

SUMMARY OF THE INVENTION

A principle object of this invention therefore, is to insure that ink jetted onto a piece of paper will solidify shortly after it strikes the paper. A further object of this invention is on insure that ink will solidify at a uniform rate regardless of where it is applied to the paper. A still further object of this invention is to position the paper relative to the ink jets with a minimal number of mechanical components.

These, and other objects of this invention, are provided by an ink curing apparatus that is attached to a printer around the ink jets. For an ink jet printer with ink jets housed on a rotating print head, the curing apparatus includes front and rear outer shell sections that extend circumferentially around the print head. When the outer shell sections are coupled together, the resulting assembly has a general annular shape with a inner diameter greater than the print head's diameter. The paper which is supplied to the printer is fed through the annular space between the print head and the first shell section.

The front shell section includes an outer wall spaced away from the print head so as to define a cavity between the paper and the outer wall. The cavity is in communication with the ambient atmosphere through small passageways in the rear shell section. A vacuum fan attached to the front shell section draws an air current through the cavity across the outside surface of the paper opposite the print head. The rear shell section includes a blower fan that blows air on the surface of the paper adjacent the print head.

When the ink curing system is in operation, the fans create air currents across both surfaces of the paper. The air currents cool the surface of the paper ink is applied to. The ink then solidifies on contact with the paper. This substantially eliminates ink dot blurring and subsequent image degradation that can occur if ink is allowed to soak into the paper.

An advantage of this system is that it insures the ink will solidify at a uniform rate regardless of where it is applied on the paper. Therefore, final image produced on paper from the individual droplets of solidified ink will have a uniform, aesthetically pleasing appearance.

Moreover, the fans can be set so the ink on the paper does not dry too rapidly. This minimzes the reduction in clinging ability inks with low physical strength have so as to prevent their cracking or flaking off the paper.

Furthermore, the fans assist in holding the paper against the front shell section. This is because the vacuum fan creates a suction that draws that paper towards the section and the blower fan forces an air current that pushes the paper against that section. The combined affect is to secure the paper in a stable position away from the print head. This insures that the paper is in a proper position relative to the ink jets when the ink is applied.

These and the other advantages of this invention are set forth in the preferred embodiment of the invention described herein.

DETAILED DESCRIPTION OF THE PREFERRED EMBODIMENT

Figure 1:
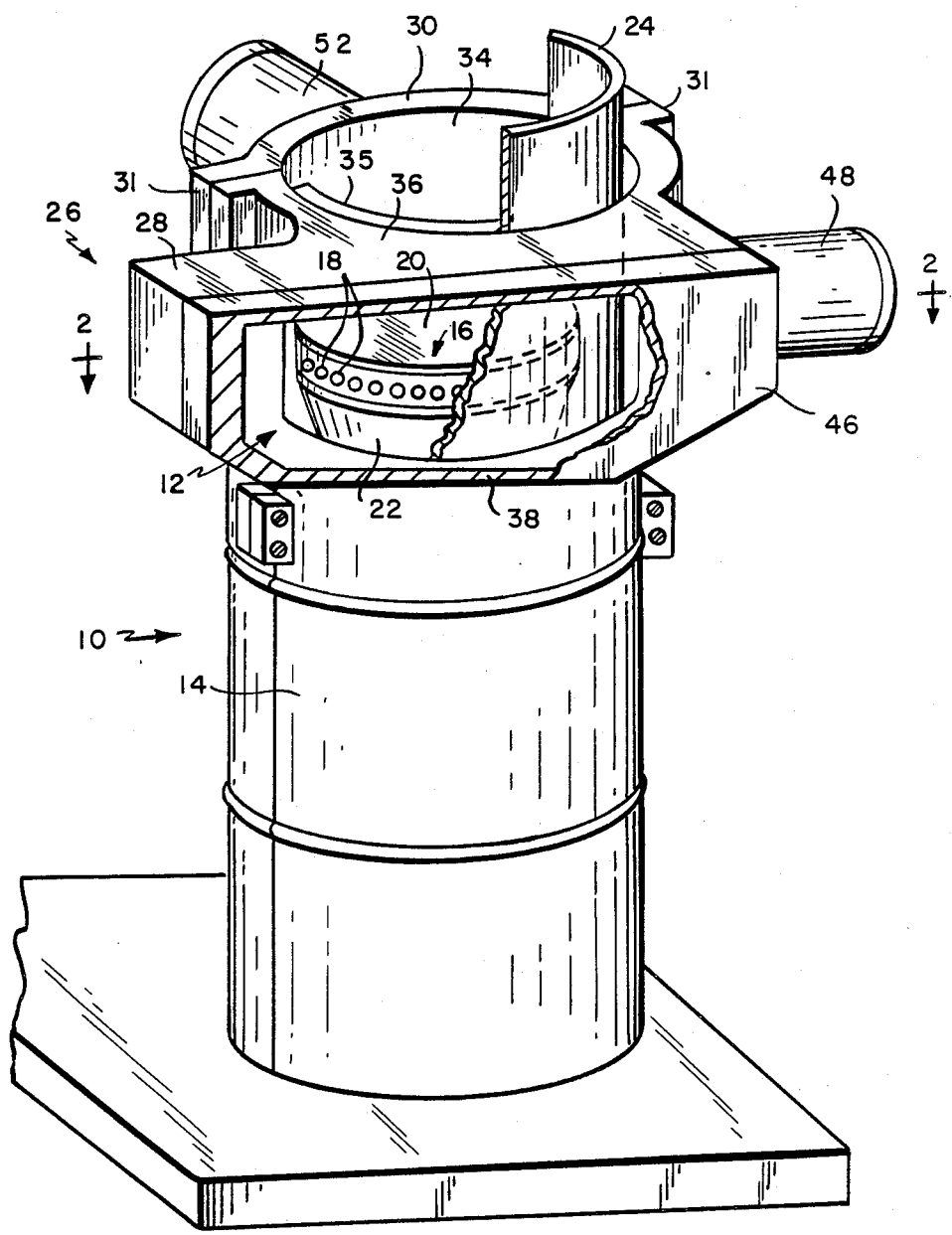
FIG. 1 is an exploded perspective view of an ink jet printer with the ink curing apparatus of this invention.

FIG. 1 illustrates an ink jet printing system 10 which includes a rotating image insertion assembly 12 partially encased within an outer shell 14. The image insertion assembly includes a print head 16, located immediately above the outer shell 14, that contains a number of ink jets 18. A print head top cover 20 is located on top of the print head and a print head bottom cover 22 is located beneath the print head 16. The print head bottom cover has a tapered profile such that the portion below the print head 16 has a diameter less than that of the print head. A sheet of paper 24 is fed up through the printer system 10 between the image insertion assembly 12 and the outer shell 14. The paper subtends an arc approximately two-thirds around the circumference of the print head 16. As the paper moves upward, ink droplets from the jets 18 are selectively deposited on it, (not illustrated.) The final image produced on the paper is the cumulative form of the individual ink droplets that have been deposited on it.

Figure 2:
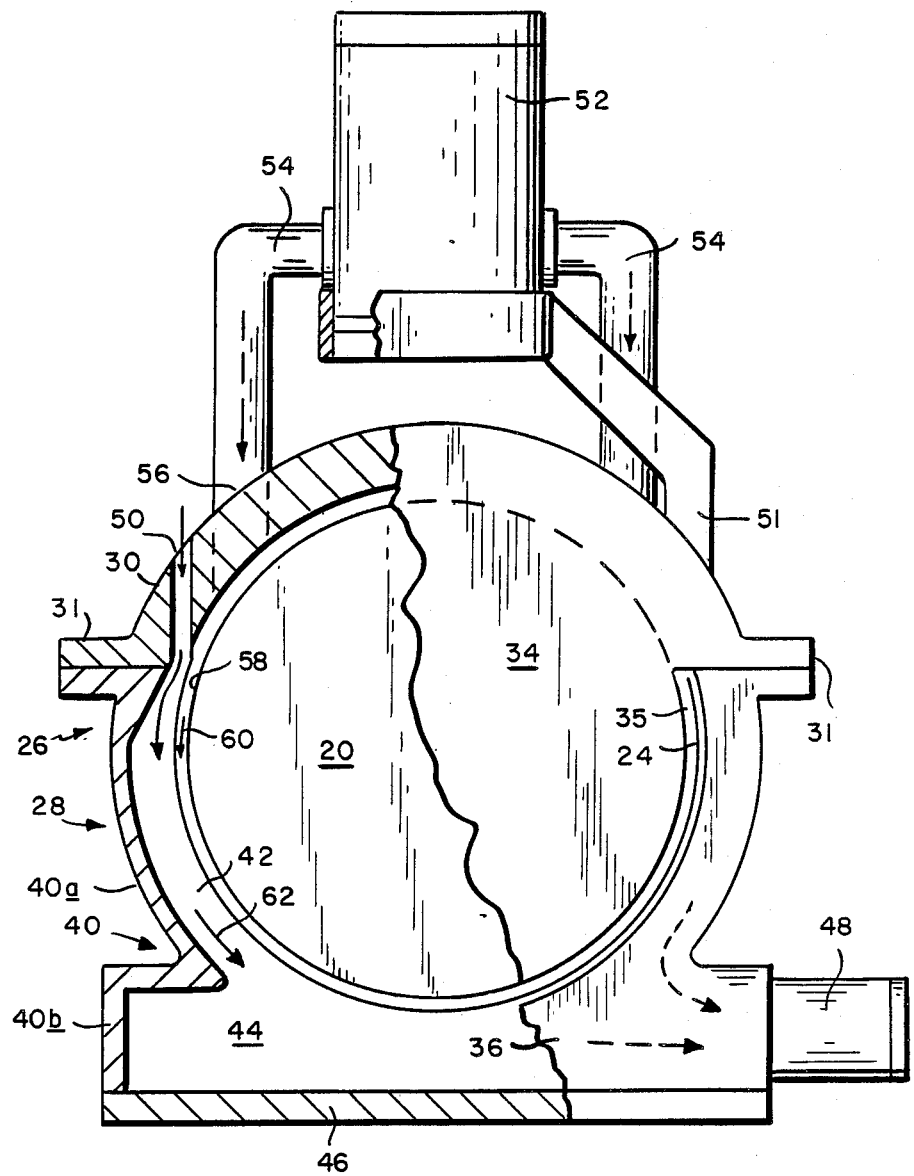
FIG. 2 is an exploded top view of the ink curing apparatus of this invention.

As shown in FIGS. 1 and 2 ink curing apparatus 26 is attached to the printer outer shell 14 over the image insertion assembly 12. The curing apparatus comprises front and rear upper shell sections 28 and 30 respectively, that surround the ink jets 18. Both sections are provided with a pair of mating flanges 31 so the sections may be coupled together. Integral with the rear upper outer shell section 30 is an off wheel ink supply cover 34 that extends over the print head 16. The off wheel ink supply cover is spaced away from the front upper shell section 28 to form a slot 35 that the paper 24 can pass through. The off wheel ink supply cover 34 may support other subsystems, (not illustrated,) that are integral to the printer 10.

The front upper shell section 28 includes top and bottom inner frames 36 and 38 respectively. Both frames subtend an arc slightly greater than that subtended by the paper 24. The top inner frame 36 is spaced immediately above the print head 16. The bottom inner frame 38 is spaced below the print head adjacent the bottom print head cover 22. As is shown in FIG. 2, the front upper shell 28 includes an outer wall 40 that is spaced away from the print head to form cavities 42, 44 between it and the paper 24. Arcuate cavities 42 are formed between the paper and arcuate sections 40a of the outer wall adjacent the rear upper shell section 30. Cavity 44, having an approximately rectangular profile, is formed by a rectangular section 40b of the outer wall that is between the arcuate sections 40a and that is the front face that overlaps them. A removable cover 46 may be located over the rectangular section 40b of the outer wall. A vacuum fan 48 is attached to one end of the rectangular section of the outer wall 40.

Figure 3:
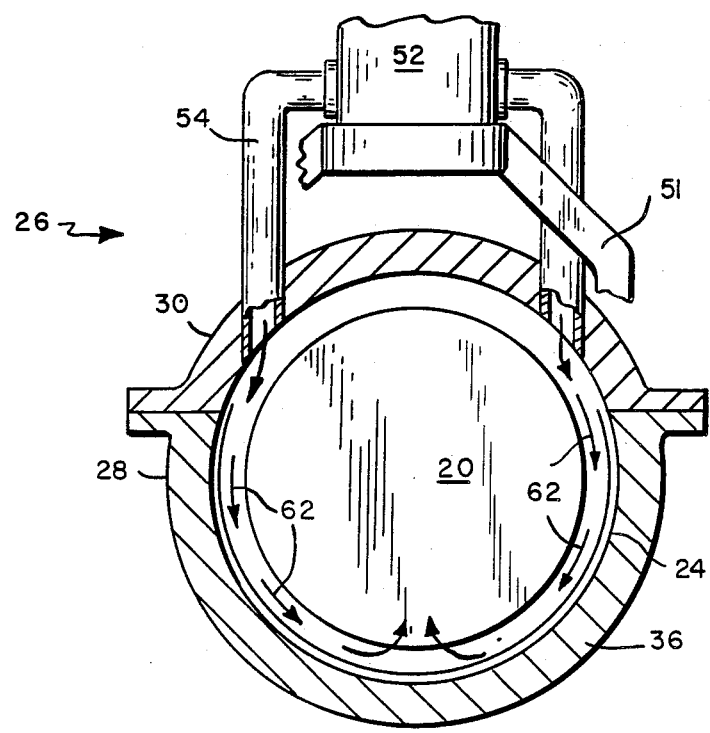
FIG. 3 is a top view of the ink curing apparatus of this invention, with the off wheel supply cover removed, showing the flow of air around both sides of the paper.
Figure 4:
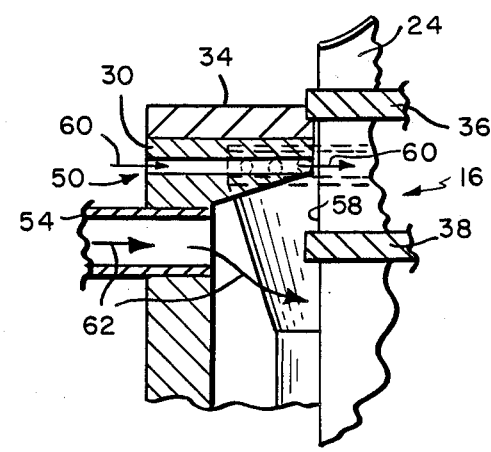
FIG. 4 is a side view of the ink curing apparatus of this invention, with a portion of the shell assembly removed, showing the flow of air around the paper.

The rear upper shell section 30, seen in FIGS. 2, 3 and 4, is provided with a pair of vacuum inlets 50 that provides communication between the outside environment and the arcuate cavities 42. Attached to the rear upper shell section by a frame 51 is a blower fan 52. The output from the blower fan is fed through a pair of tubes 54 into a pair of blower ducts 56 in the shell section 30. The blower ducts 56 are located below the vacuum inlets 50 and each opens into an annular cavity 58 having an inner perimeter defined by the print head 16 and print head bottom cover 22, and an outer perimeter defined by the rear upper shell section 30 and the paper 24.

When the ink curing apparatus 26 is in operation, the vacuum fan 48 and the blower fan 52 are both activated. The blower fan forces air currents, represented by arrows 60, through the ducts 56 through the annular cavity 58, over the surface of the paper adjacent the print head 16 and through the slot 35. The blower fan is set so the air current drawn across the paper will not distort the flow of the ink droplets onto it. The vacuum fan 48 draws air currents, represented by arrows 62, through the vacuum inlets 50 through the cavities 42, 44 and across the outside of the paper 24 opposite the print head 16. Since the vacuum inlets 50 are aligned with the print head 16, most of the air flow is adjacent the portion of paper that is being printed on.

The air currents blowing across the paper 24 cool the section of it that is being printed on. As a result the heated, liquefied ink solidifies on contact with the paper. This substantially eliminates bleeding of the ink through the paper and subsequent blurring of the final image generated. This also prevents solidified masses of ink from forming within the paper that would give it a lumpy texture.

Another advantage of this ink curing apparatus 26 is that the air currents cause the section of paper 24 being printed on to have an approximately uniform temperature. The ink therefore solidifies at a constant rate regardless of where it is deposited on the paper. As a result, on the final printed paper, the solidified ink has a uniform, aesthetically pleasing appearance.

The ink curing apparatus 26 also holds the paper in place during the printing process. The air currents caused by the vacuum pump 48 tend to suck the paper 24 towards the cover 46. The air currents caused by the blower fan 52 blow the paper in the same direction. As a result, the section of the paper 24 being printed on is firmly held against the top and bottom inner frames 36, 38. The paper 24 is thus secured in the proper position during the printing process without the use of expensive mechanical holding mechanisms that must be accurately aligned.

It is understood that this description is for the purposes of illustration. Certain changes may be made in the above application without departing from the scope of the invention. For example, alternative placements of the vacuum inlets and blower ducts may be desirable. In some embodiments it may not be necessary to provide both blower fan and a vacuum fan. Furthermore, the apparatus 26 need not be a two-section unit. In some instances it may be desirable to attach the front and rear shell sections to posts on either side of the outer shell 14 that house the paper feed mechanism. The essential consideration is to provide at least one cavity adjacent the surface of the paper being printed on, and to force an air current through the cavity, so the surface of the paper being printed on will be cooled.

Therefore, it is intended that the following claims cover all the generic and specific features of the invention herein described.

What is claimed as new and desired to be secured by Letters Patent of the United States is:

1. An ink curing apparatus for an ink jet printer having at least one ink jetter through which ink is discharged onto an adjacent paper sheet having top, bottom and side edges, said apparatus comprising:
   (A) a shell over the portion of the printer where said ink jetter is located, said shell having a shell wall spaced from said ink jetter and said sheet so as to form a cavity between said sheet and the shell wall that extends between the side edges of the sheet;
   (B) a plurality of openings extending from the exterior of said shell into said cavity, at least two of said openings being located adjacent to the side edges of said sheet; and
   (C) air moving means coupled to at least one of said plurality of openings into said cavity for moving air through said at least one opening so as to produce a flow of air between the side edges of the sheet that flows over and generally parallel to a surface of said sheet.

2. The ink curing apparatus of claim 1 wherein:
   (A) said ink jetter is mounted on a cylindrical print head; and
   (B) the shell wall spaced away from said print head is arcuate so as to form an at least partially arcuate cavity.

3. The ink curing apparatus of claim 2 wherein said shell includes a plurality of shell sections that surround the circumference of said prin head, with one section having a substantially arcuate shell wall spaced away from said print head and said paper.

4. The ink curing apparatus of claim 1 wherein said shell includes a second shell section and said at least two openings are located in said second shell section.

5. The ink curing apparatus of claim 1, wherein
   (A) said at least two of said openings open into said cavity at the side of the paper sheet facing the ink jetter, and
   (B) the air moving means is a blower fan mounted to said shell.

6. The ink curing apparatus of claim 1 wherein
   (A) said at least two of said openings open into said cavity at the side of the paper sheet facing away from the ink jetter, and
   (B) the air moving means is a vacuum fan mounted to said shell.

7. The ink curing apparatus of claim 6
   (A) wherein a third and a fourth opening open into said cavity at the side of the paper sheet facing the ink jetter, and
   (B) further including a blower fan mounted to said shell for blowing air through one of said third and fourth openings into said cavity.

8. An ink curing apparatus for an ink jet printer of the type having at least one ink jetter through which ink is discharged onto an adjacent paper sheet having top, bottom and side edges, said apparatus comprising
   (A) reference means defining a paper reference position spaced opposite said jetter;
   (B) housing means defining a cavity between the jetter and a paper sheet referenced by the reference means, said cavity extending between the side edges of the sheet;
   (C) a plurality of openings extending from the exterior of said shell housing means into said cavity, at least two of said openings being located adjacent opposite edges of said sheet, and
   (D) air moving means coupled to at least one of said plurality of openings for moving air through said at least one opening to produce a flow of air between said opposite edges of the paper sheet referenced by the reference means so that air blows over a surface of that sheet generally parallel thereto.

9. The ink curing apparatus of claim 8 wherein
   (A) at least one of said openings opens into said cavity at the side of the sheet facing the ink jetter, and
   (B) the air moving means is a blower fan mounted to said housing means for blowing air into said cavity.

10. The ink curing apparatus of claim 9 wherein at least two of said openings open into the cavity at the side of the sheet facing the jetter, said two openings being located adjacent to opposite side edges of the sheet.

11. The ink curing apparatus of claim 8 wherein
    (A) said at least one ink jetter is mounted to a cylindrical print head that is rotatable about its axis, and
    (B) said reference means curves about said axis radially outboard of the print head.

12. The ink curing apparatus of claim 8 wherein
    (A) at least one of said openings opens into said cavity at the side of said sheet facing away from the ink jetter, and
    (B) said air moving means draws a vacuum in the cavity.

13. The ink curing apparatus of claim 12 wherein at least two openings open into said cavity at the side of the sheet facing away from the jetter and adjacent to opposite edges of the sheet.

* * * * *